(12) United States Patent
Chang

(10) Patent No.: US 6,553,003 B1
(45) Date of Patent: Apr. 22, 2003

(54) DEVICE AND METHOD PROCESSING A RADIO LINK PROTOCOL IN A MOBILE COMMUNICATION SYSTEM

(75) Inventor: Hoon Chang, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/333,190

(22) Filed: Jun. 14, 1999

(30) Foreign Application Priority Data

Jun. 13, 1998 (KR) .............................................. 98-22216

(51) Int. Cl.⁷ .............................................. H04L 12/28
(52) U.S. Cl. ...................... 370/256; 370/408; 370/342; 370/474
(58) Field of Search ................................. 370/238, 256, 370/400, 408, 465, 468, 474, 349, 328, 335, 338, 342, 473, 470, 394

(56) References Cited

U.S. PATENT DOCUMENTS 6,021,124 A * 2/2000 Haartsen ..................... 370/336
6,317,430 B1 * 11/2001 Knisely et al. ............. 370/394
6,396,814 B1 * 5/2002 Iwamura et al. ............ 370/256
6,408,003 B1 * 6/2002 Rezaiifar et al. ........... 370/394

* cited by examiner

Primary Examiner—Vivian Chin
Assistant Examiner—John J Lee
(74) Attorney, Agent, or Firm—Dilworth & Barrese, LLP

(57) ABSTRACT

A method for generating sequence numbers for an RLP frame in a mobile communication system is provided. The method includes the steps of generating a sequence number tree having a plurality of nodes each associated with frame information and a data rate; upon receipt of a sequence number request from an RLP controller, reading, at an RLP sequence number generator, frame information for a designated node from the sequence number tree and providing the read frame information to the RLP controller; and upon receipt of the frame information in response to the sequence number request, transmitting and receiving a frame at the RLP controller.

19 Claims, 12 Drawing Sheets

| 93 | | | | | |
|---|---|---|---|---|---|
| 45 | | | 45 | | 3 |
| 21 | 21 | 3 | 21 | 21 | 3 |

FIG. 1

DEVICE AND METHOD PROCESSING A RADIO LINK PROTOCOL IN A MOBILE COMMUNICATION SYSTEM

PRIORITY

This application claims priority to an application entitled "Device and Method for Processing Radio Link Protocol in Mobile Communication System" filed in the Korean Industrial Property Office on Jun. 13, 1998 and assigned Serial No. 98-22216, the contents of which are incorporated herein by reference.

BACKGROUND OF THE INVENTION

1. Field of the Invention

The present invention relates generally to a mobile communication system and in particular, to a device and method for processing a radio link protocol in a CDMA communication system. Specifically, the present invention relates to a device and method for processing a radio link protocol for packet data communication in a variable rate environment in a CDMA communication system.

2. Description of the Related Art

A code division multiple access (CDMA) mobile communication system is based on the IS-95 standard which mainly supports a voice service. In the near future, mobile communication systems will be based on the IMT-2000 standard which supports both voice service and high-speed data transfer service. For example, the IMT-2000 standard can support a high-quality voice service, a moving picture service, an Internet search service, etc. In the IS-95 CDMA mobile communication system which mainly supports the voice service, the maximum data rate is 9.6 Kbps or 14.4 Kbps. In the IMT-2000 CDMA communication system, a possible maximum data rate of 2 Mbps is attainable. Hence, data which can be transmitted within a unit time can be transmitted approximately 256 times faster using the IMT-2000 standard than the IS-95 standard for a CDMA mobile communication system.

The CDMA mobile communication system solves a data loss problem which frequently occurs in a radio environment which uses a radio link protocol (RLP). For the radio link protocol, a frame having a length of 20 ms is used. The frame is typically transmitted at a data rate of 9.6 Kbps or 14.4 Kbps. The 20 ms RLP frames are assigned sequence numbers so that a data frame which is lost during transmission in the radio environment may be retransmitted. The sequence numbers used in the radio link protocol during data frame transmission are composed of 8 bits, so that the radio link protocol can support a maximum of 256 frames.

In the case where the data rate increases and becomes greater than an existing data rate during retransmission of the radio link protocol, the frame to be retransmitted is transmitted together with another frame. Accordingly, it is possible to transmit the frames more effectively at the higher data rate. However, in the case where the data rate decreases and becomes lower than the existing data rate during retransmission of the radio link protocol, the frame to be retransmitted should be segmented, prior to transmission, into several frames to be suitable for a low transmission data rate.

In the latter case, the frame can be segmented into a maximum of three sub-frames. In this case, a receiving party reassembles the three sub frames into the original frame.

However, as indicated above, the IMT-2000 standard supports a maximum data rate of 2 Mbps, which is much greater than the maximum data rate of 9.6 Kbps or 14.4 Kbps supported in the radio link protocol. Hence, it is difficult to apply the existing radio link protocol having the low data rate to the IMT-2000 standard. Furthermore, to support various data rates, the frame segmentation process should be separately designated for the various complex situations.

SUMMARY OF THE INVENTION

It is, therefore, an object of the present invention to provide a device and method for effectively supporting a radio link protocol even in the case where a mobile station and a base station of a mobile communication system connected to each other via a radio channel experiences a change in data rate.

It is another object of the present invention to provide a device and method for retransmitting data lost during transmission for protecting the integrity of the transmitted data, especially in the case where a mobile station performing packet data communication with a base station of a mobile communication system experiences a change in data rate with respect to a connected radio channel during data transmission.

It is further another object of the present invention to provide a device and method for effectively retransmitting lost data by proposing a termination frame not to generate a data-less frame in a mobile communication system.

To achieve the above objects, a method is provided for generating sequence numbers for an RLP frame in a mobile communication system. The method includes the steps of generating a sequence number tree having a plurality of nodes each associated with frame information and a data rate; upon receipt of a sequence number request from an RLP controller, reading, at an RLP sequence number generator, frame information for a designated node from the sequence number tree and providing the read frame information to the RLP controller; and upon receipt of the frame information in response to the sequence number request, transmitting and receiving a frame at the RLP controller.

BRIEF DESCRIPTION OF THE DRAWINGS

The above and other objects, features and advantages of the present invention will become more apparent from the following detailed description when taken in conjunction with the accompanying drawings, in which:

FIG. 1 is a diagram illustrating a case where a frame being transmitted at a higher data rate is retransmitted at a lower data rate according to an embodiment of the present invention;

DETAILED DESCRIPTION OF THE PREFERRED EMBODIMENT

Figure 2:
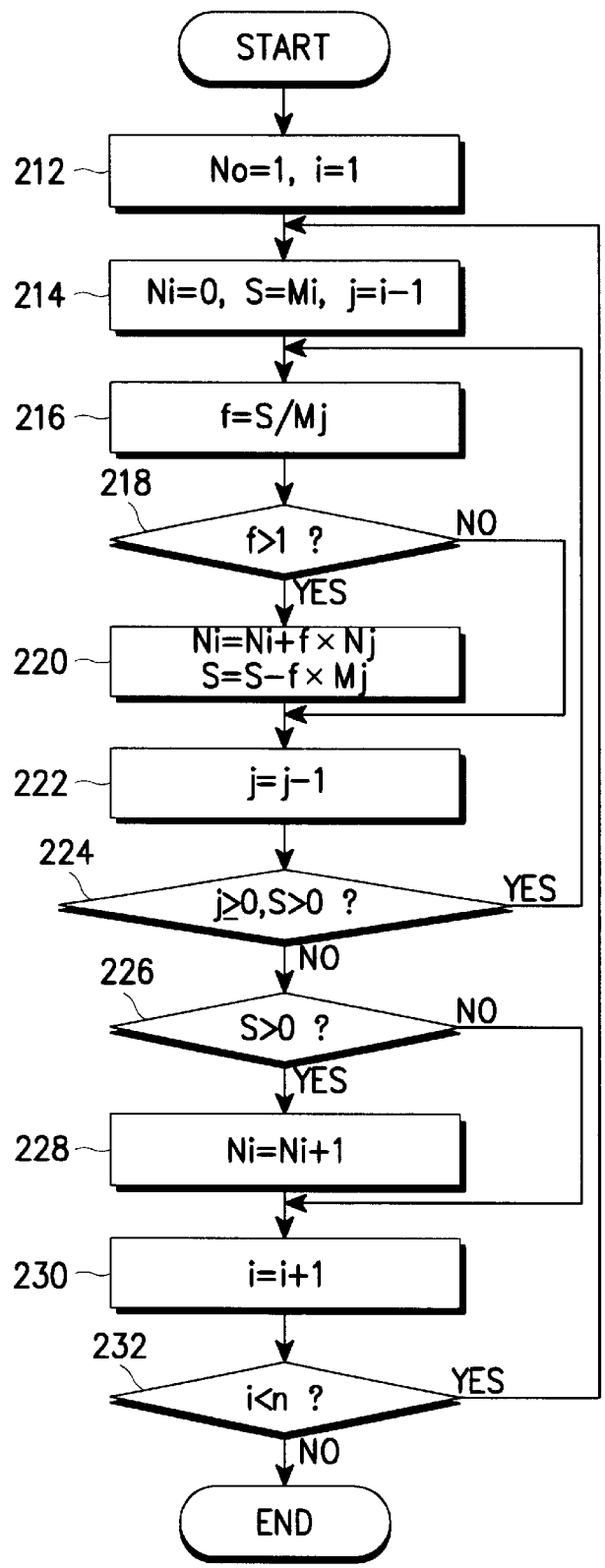
FIG. 2 is a flow chart illustrating a method of generating sequence numbers required for respective data rates according to an embodiment of the present invention.

A preferred embodiment of the present invention will be described hereinbelow with reference to the accompanying drawings.

For an effective data communication, a CDMA mobile communication system generally requires a new sequence number generation method capable of preventing a data loss in a radio environment with data rate being varied at any time. The present invention provides a new sequence number generation method which is compatible with an existing radio link protocol. Table 1 shows data rates and associated frame sizes (or lengths) which are supported by the IMT-2000 standard. The frame lengths represent the maximum frame lengths permissible at the associated data rates.

TABLE 1

| Order (i) | Data Rate IMT-2000 System | Frame Size | Data Rate IMT-2000 System | Frame Size |
|---|---|---|---|---|
| 0 | 9.6 Kbps | 21 Bytes | 14.4 Kbps | 33 Bytes |
| 1 | 19.2 Kbps | 45 Bytes | 28.8 Kbps | 69 Bytes |
| 2 | 38.4 Kbps | 93 Bytes | 57.6 Kbps | 141 Bytes |
| 3 | 76.8 Kbps | 189 Bytes | 115.2 Kbps | 285 Bytes |
| 4 | 153.6 Kbps | 381 Bytes | 230.4 Kbps | 573 Bytes |
| 5 | 307.2 Kbps | 765 Bytes | 460.8 Kbps | 1149 Bytes |
| 6 | 614.4 Kbps | 1533 Bytes | 921.6 Kbps | 2301 Bytes |
| 7 | 1036.8 Kbps | 2589 Bytes | 1036.8 Kbps | 2589 Bytes |
| 8 | 1228.8 Kbps | 3069 Bytes | 1843.2 Kbps | 4605 Bytes |
| 9 | 2073.8 Kbps | 5181 Bytes | 2073.6 Kbps | 5181 Bytes |
| 10 | 2457.8 Kbps | 6141 Bytes | | |

To prevent a data loss at a change in data rate while supporting the various data rates of table 1, a large RLP frame being transmitted at a higher data rate should be segmented into several sub-frames, which are transmitted at a lower data rate. With respect to frame segmentation, the conventional radio link protocol provides a frame segmentation and reassembly method capable of segmenting a frame into a maximum of three sub-frames. However, such a frame segmentation and reassembly method is unsuitable for the case where there are ten or more available data rates and a frame can be segmented into several hundred sub-frames as shown in Table 1.

In the exemplary embodiment, a large RLP frame is segmented into several blocks and unique sequence numbers are assigned to the segmented blocks. Accordingly, it is possible to protect received data and selectively retransmit only the necessary segmented blocks. To assign unique sequence numbers to the respective segmented blocks, the same sequence number should not be used for other blocks or frames. Therefore, when generating a large RLP frame, the maximum number of the sequence numbers should be previously reserved so that the other blocks or frames may not use the reserved sequence numbers.

Figure 1:
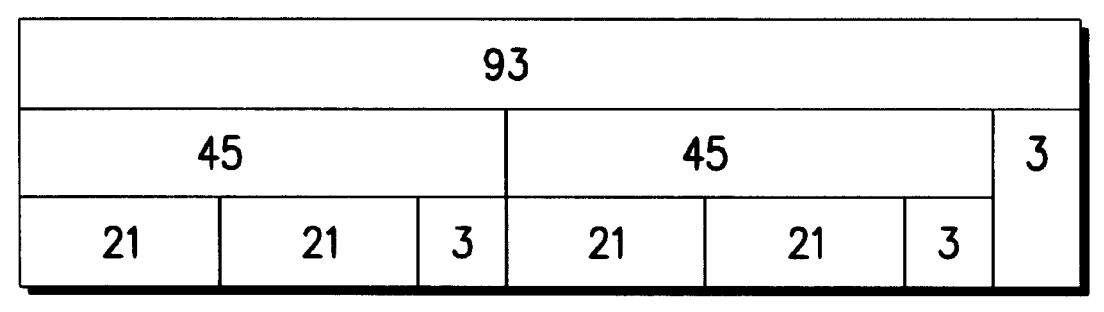

FIG. 1 illustrates a case where an RLP frame being transmitted at a higher data rate (e.g., 38.4 Kbps in Table 1) is retransmitted at a lower data rate according to an embodiment of the present invention. In this case, when the data rate of 38.4 Kbps decreases to the lower data rate of 19.2 or 9.6 Kbps, a 93-byte frame should be segmented into the frames having the size permissible at the lower data rate. In addition, for assignment of the unique sequence numbers, the maximum number of the sequence numbers should be reserved as stated above. In segmenting a frame having a specific size, it is preferable to segment the frame several times rather than one time to generate the maximum number of blocks. Hence, to predict the maximum number of segmented blocks, it should be considered that a 38.4 Kbps frame is first segmented into 19.6 Kbps frames and then the 19.6 Kbps frames are segmented again into 9.6 Kbps frames.

In such a case, the 93-byte frame is segmented into two 45-byte blocks and one 3-byte block at the data rate of 19.2 Kbps; the segmented blocks are again segmented into four 21-byte blocks and three 3-byte segmented blocks at the data rate of 9.6 Kbps. Here, it is noted that the last block out of the three segmented blocks for the data rate of 19.2 Kbps is composed of only three bytes. Therefore, when the data rate is decreased again to 9.6 Kbps, it is not necessary to segment this block again, and the block is transmitted within one 9.6 Kbps frame.

In the general case where various data rates are provided, the number of required sequence numbers can be calculated in accordance with the procedure of FIG. 2. The procedure of FIG. 2 is performed based on the following assumptions:
 1) the number of variable data rates is n;
 2) a frame having the lowest data rate among n data rates has a frame size $M_0$; a frame having the second lowest data rate has a frame size $M_0$; in this manner, a frame having the highest data rate has a frame size $M_{n-1}$; and
 3) the number of the required sequence numbers calculated in accordance with FIG. 2 is stored in $N_0$ for the lowest data rate; the number of the required sequence numbers in $N_1$ for the second lowest data rate; in this manner, the number of the required sequence numbers in $N_{n-1}$ for the highest data rate.

Referring to FIG. 2, the number, $N_0$, of the required sequence number at the lowest data rate is defined as 1 (Step 212). Further, it is assumed that for $0<i<n$ and $0<k \leq j(=i-1)$, values $N_k$ are all calculated. To calculate the number, $N_i$, of the required sequence numbers for an i-th data rate, a value $N_i$ is set to 0 and a value $M_i$ is stored in a variable S (Step 214). Here, it is assumed that the highest value among the values $M_k$ (where k is an integer between 0 and (i−1)) which is lower than S, is $M_j$. And, a quotient obtained by dividing S by $M_j$ is defined as f(Step 216) and then, it is determined whether f>1 (Step 218). With f>1, $N_i$ is updated by $N_i+(f \times N_j)$ and S is updated by $S-(S*M_j)$ (Step 220). However, if f<1 or if $N_i$ is updated by $N_i+(f \times N_j)$ and S is updated by $S-(S*M_j)$, the variable j is decreased by 1 (Step 222). Further, it is determined whether the variables j is larger than or equal to 0 and the variable S is larger than 0 (Step 224). When the condition of step 224 is satisfied, the procedure returns to step 216 to repeat the succeeding steps. However, when the condition of step 224 is not satisfied, it is determined whether the variable S is larger than 0 (Step 226). With S>0, $N_i$ is increased by 1 (Step 228); with S≦0, i is increased by 1 (Step 230). Thereafter, it is examined whether i is smaller than n (Step 232). When i is smaller than n, the procedure returns to step 214 to repeat the succeeding steps.

In FIG. 2, the point is that when data remaining after transmission at an immediately lower data rate is small in size, if the data can be transmitted even at the further lower data rate without segmentation, the data is transmitted within one frame, using only one sequence number. For example, it is assumed that a 93-byte frame generated at the data rate of 38.4 Kbps is retransmitted at the data rate of 19.2 Kbps. In this case, since the frame size is 45 bytes at the data rate of 19.2 Kbps, the 93-byte frame is segmented into two 45-byte blocks and one 3-byte block. In addition, the 45-byte frame is segmented again into three blocks at the further lower data rate of 9.6 Kbps, thereby requiring three sequence numbers. Here, since the 3-byte block can be transmitted within one frame even though the data rate is increased to 9.6 Kbps, it uses only one sequence number. As a result, when the 93-byte frame is retransmitted at the data rate of 9.6 Kbps, 7 sequence numbers are required.

Table 2 shows the number of required sequence numbers (SNs) at the respective data rates, calculated in accordance with the procedure of FIG. 2 according to an embodiment of the present invention.

TABLE 2

| Order (i) | Data Rate IMT-2000 System | No of Required SNs | Data Rate IMT-2000 System | No of Required SNs |
|---|---|---|---|---|
| 0 | 9.6 Kbps | 1 | 14.4 Kbps | 1 |
| 1 | 19.2 Kbps | 3 | 28.8 Kbps | 3 |
| 2 | 38.4 Kbps | 7 | 57.6 Kbps | 7 |
| 3 | 76.8 Kbps | 15 | 115.2 Kbps | 15 |
| 4 | 153.6 Kbps | 31 | 230.4 Kbps | 31 |
| 5 | 307.2 Kbps | 63 | 460.8 Kbps | 63 |
| 6 | 614.4 Kbps | 127 | 921.6 Kbps | 127 |
| 7 | 1036.8 Kbps | 213 | 1036.8 Kbps | 143 |
| 8 | 1228.8 Kbps | 252 | 1843.2 Kbps | 253 |
| 9 | 2073.8 Kbps | 426 | 2073.6 Kbps | 288 |
| 10 | 2457.8 Kbps | 505 | | |

Figure 3:
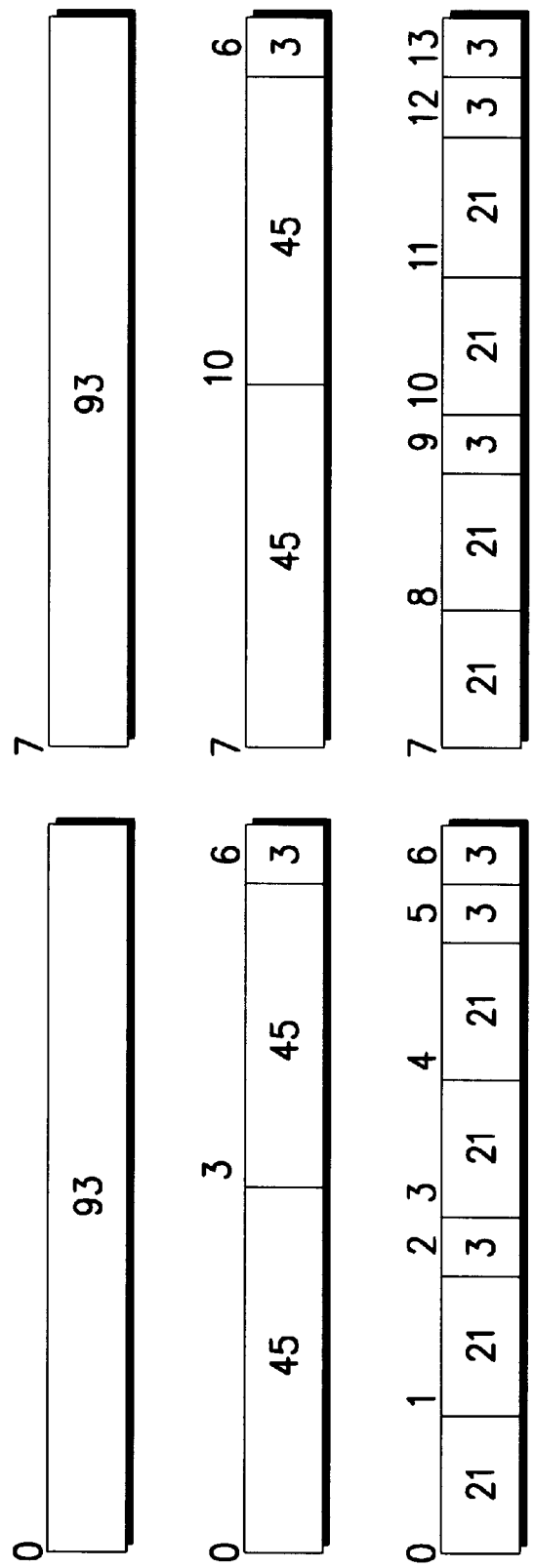
FIG. 3 is a diagram illustrating how to assign sequence numbers when a frame being transmitted at a higher data rate is retransmitted at a lower data rate according to an embodiment of the present invention.

FIG. 3 shows a case where the sequence numbers are segmented blocks of FIG. 1 in accordance with the procedure of FIG. 2. Referring to FIG. 3, sequence numbers 0 and 7 are assigned to two 93-byte frames generated at the data rate 38.4 Kbps, respectively. When the data rate is decreased to 19.2 Kbps and both of the two frames should be retransmitted, the respective frames are segmented into three blocks, generating six segmented blocks in total, to which sequence numbers 0, 3, 6, 7, 10 and 13 are assigned, respectively. When the data rate is decreased again to 9.6 Kbps and all of the six segmented frames should be retransmitted, the six 19.2 Kbps frames are segmented into 14 frames, to which sequence numbers from 0 to 13 are sequentially assigned.

Although a transmission party has transmitted frames up to a frame having a sequence number S, a receiving party may receive the frames up to only a frame having a sequence number R (where S>R), if the data rate increases at a certain time. As the data rate increases, the receiving party then reassembles the received frame having sequence number R and the following frames according to the new data rate and the new sequence number generation method. In addition, since the transmission party cannot know up to which frame the receiving party has received, it should prepare for retransmission of even the frames preceding the frame with the sequence number R. That is, all the frames up to the frame with the sequence number S should be uniquely distinguishable even in the new sequence number generation method.

As described above, sequence numbers should be assigned even to the frames generated at the lower data rate in accordance with the procedure of FIG. 2, providing for an increase in data rate. To assign the sequence numbers preparing for an increase in data rate, it is necessary to generate a sequence number tree.

Figure 4:
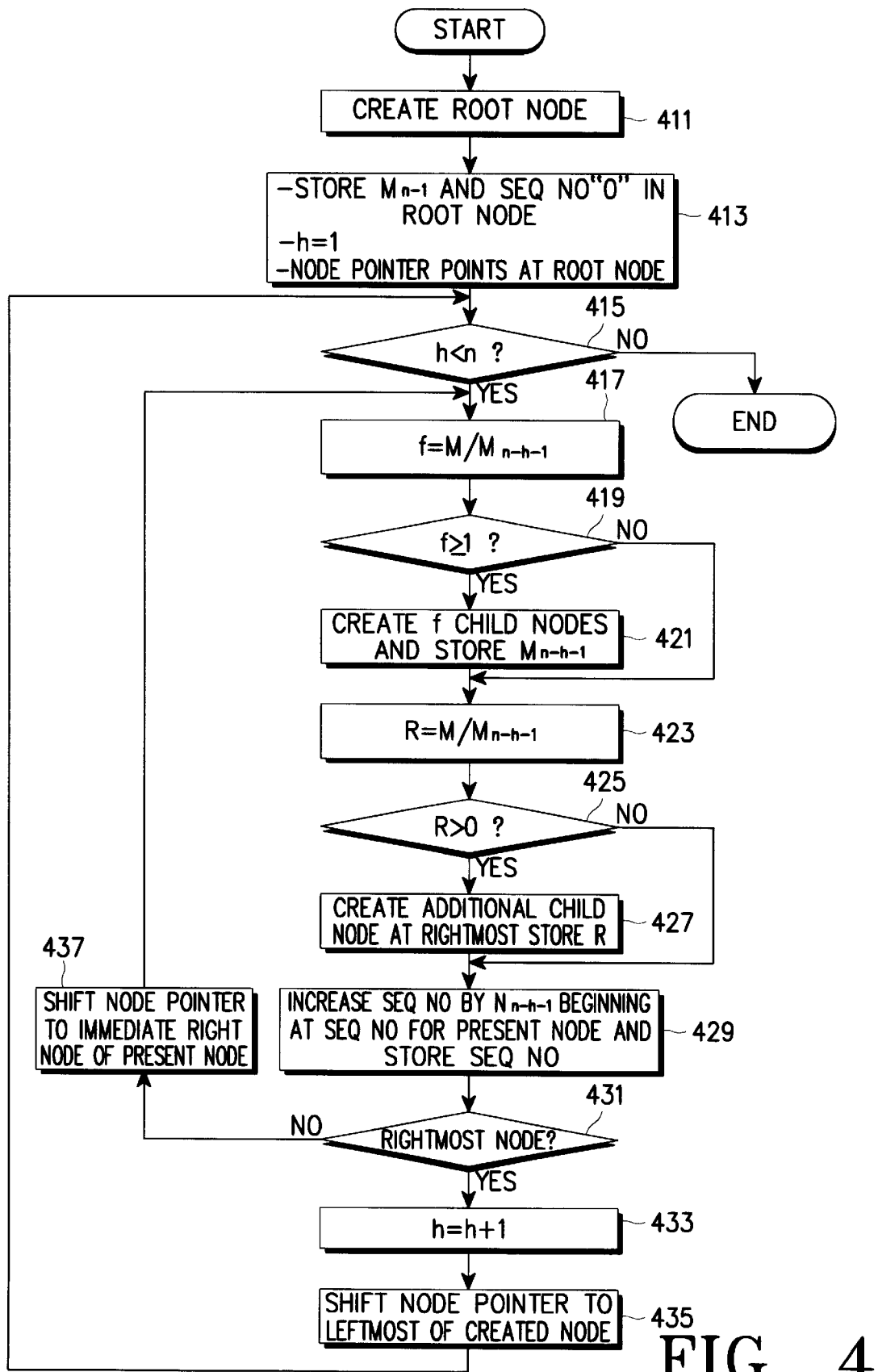
FIG. 4 is a flow chart illustrating a procedure for generating a sequence number tree according to an embodiment of the present invention.

FIG. 4 illustrates a procedure of generating a sequence number tree according to an embodiment of the present invention. In step 411, a root node is created. In step 413, a frame size $M_{n-1}$ and a sequence number "0" for the highest data rate is stored in the root node, and a variable h representative of a root height is initialized to "1". Further, a node pointer is controlled to point at the root node. Thereafter, it is determined in step 415 whether a value stored in the variable h is lower than n (where n denotes the number of data rates supported by the system; for a Rate Set 1 of the IMT-2000 system, n is 11). When the value stored in the variable h is smaller than n, the procedure goes to step 417; otherwise, the procedure terminates.

Meanwhile, in step 417, a quotient f is calculated by dividing the frame size M stored in a node presently pointed by the node pointer by a frame size $M_{n-h-1}$ for a data rate being lower by one step than a data rate of the node. It is examined in step 419 whether the calculated quotient f is higher than or equal to 1. When the quotient f is higher than or equal to 1, the procedure goes to step 421; otherwise, the procedure goes to step 423. In step 421, child nodes are created as many as the quotient f and the frame size $M_{n-h-1}$ for the one-step lower data rate is stored in the child nodes. In step 423, a remainder R obtained by dividing the frame size M stored in the node presently pointed by the node pointer by the frame size $M_{n-h-1}$ for the one-step lower data rate.

Thereafter, it is determined in step 425 whether the remainder R is higher than "0". When the remainder R is higher than "0", the routine proceeds to step 427 where one child node is additionally created at the rightmost side of the child node created in step 421 to store the remainder R in the created child node. However, when the remainder R is not higher than "0" in step 425, the procedure jumps to step 429. In step 429, sequence numbers are stored in the respective child nodes by increasing the sequence number by the number, $N_{n-h-1}$, of the one-step lower data rate, beginning at a sequence number of the node pointed by the present pointer.

Subsequently, it is checked in step 431 whether the node pointer presently points at the rightmost node. If the node pointer presently points at the rightmost node, the procedure goes to step 433; otherwise, the procedure goes to step 437 where the node pointer is controlled to point at the immediate right node and thereafter, the procedure returns to step 417 to perform the succeeding steps again. Meanwhile, in step 433, a value stored in the variable h is increased by "1". After increasing the variable h, the node pointer is shifted to the rightmost node out of the child nodes in step 435. After that, the routine returns to step 415 to repeat the succeeding steps.

To sum up, (1) with respect to the sequence number tree, a root node is created for the highest data rate. In this root node, a size value $M_{n-1}$ of a frame is stored which can be transmitted at the highest data rate, and a sequence number "0". A height h of the present tree is 1. (2) When the height h of the tree is less than n, the following step (3) is repeated. When the height h of the tree becomes equal to n, creation of the tree is completed. (3) For leaf nodes, $L_0, L_1, \ldots, L_k$, of the present tree, the following steps (4) and (5) are repeatedly performed. Performing the steps (4) and (5) will increase the height h of the tree by one. (4) A quotient f is calculated by dividing a value M stored in a node $L_1$ ($0 \leq i \leq k$) by $M_{n-h-1}$. When the calculated quotient f is larger than or equal to 1, new child nodes are created for the node $L_1$ as many as f, and the value $M_{n-h-1}$ is stored in the respective child nodes. When a sequence number for the node $L_1$ is S, sequence numbers, S, $S+M_{n-h-1}$, $S+2^*M_{n-h-1}, \ldots, S+(f1)^*M_{n-h-1}$, are stored in the child nodes one after another, beginning at the rightmost child node. (5) A remainder R is calculated by dividing the value M stored in the node $L_1$ by $M_{n-h-1}$. When the remainder R is larger than 0, a new child node is additionally created for the node $L_1$ at the rightmost, and the value R is stored in the newly created child node. In this child node is stored a sequence number $S+f^*M_{n-h-1}$.

Figure 5:
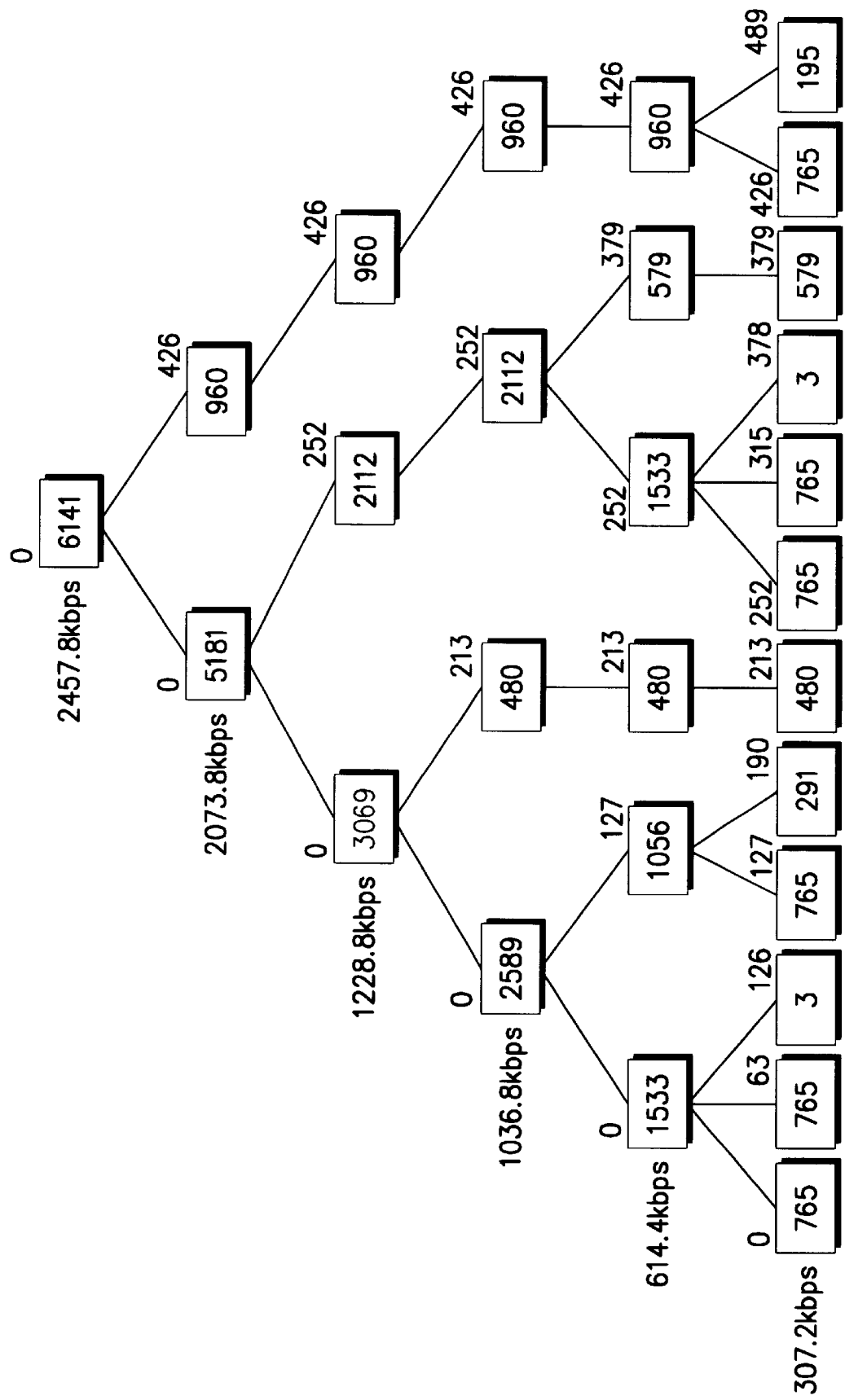
FIG. 5 is a diagram illustrating a sequence number tree according to an embodiment of the present invention.

In the above procedure, the values $M_x$ and $N_y$ have the same meaning as defined in the method of calculating the number of required sequence numbers. FIG. 5 illustrates a sequence number tree created in accordance with the above sequence number tree creation procedure and the frame sizes for the IMT-2000 system shown in Table 1. FIG. 5 shows a case where nodes are created for data rates from 2457.8 Kbps to 307.2 Kbps.

By creating the sequence number tree in this manner, it is possible to simply assign the sequence numbers during transmission. Further, during transmission, when a present data rate is R, the nodes having the data rates R are transmitted in sequence from the left side to the right side based on the sequence number tree; after completion of transmitting the nodes, transmission is restarted from the left side. Of course, at this time, it is necessary to create a new sequence number by adding a value $N_{n-1}$ to the sequence number for the node. For example, in FIG. 5, when the present data rate is 1036 Kbps, 2589 bytes are transmitted in a frame with a sequence number "0"; 480 bytes are transmitted in a frame with a sequence number "213"; 2112 bytes are transmitted in a frame with a sequence number "252"; 960 bytes are transmitted in a frame with a sequence number "426"; thereafter, 2589 bytes are transmitted in the frame with the sequence number "505", by turning back to the beginning of the tree.

Figure 6:
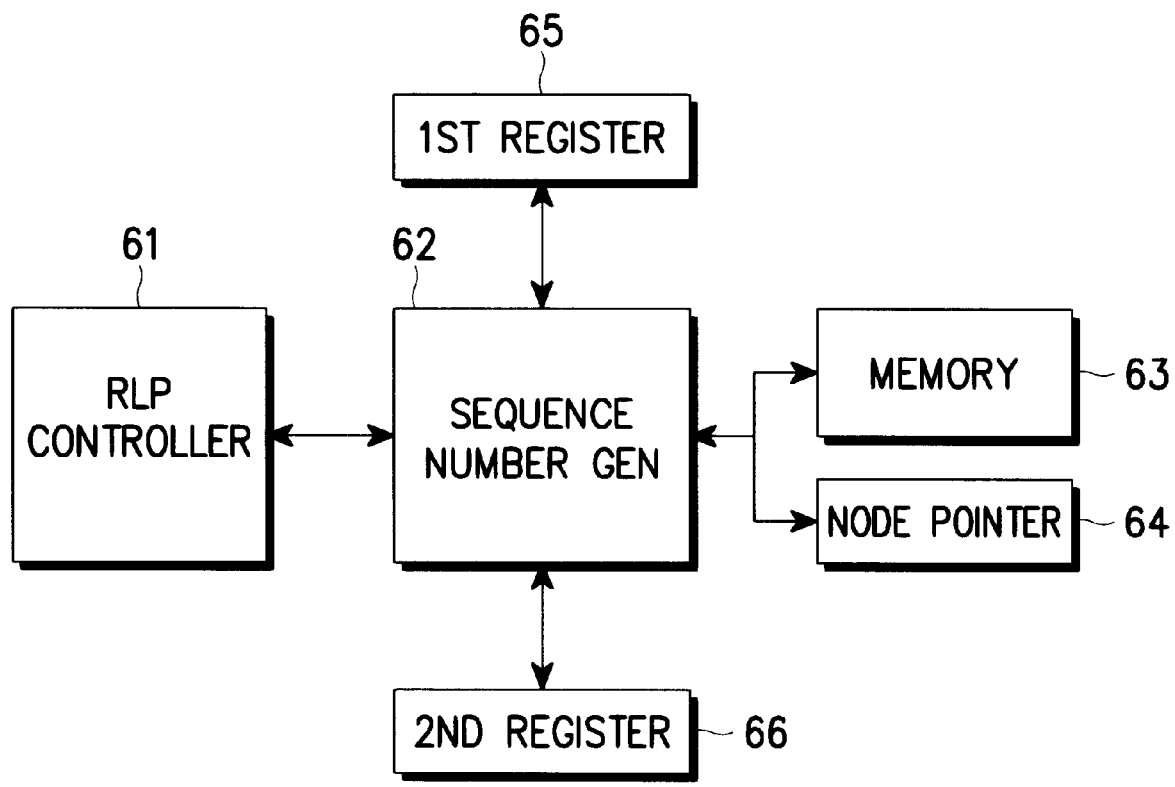
FIG. 6 is a block diagram illustrating an RLP sequence number generator according to an embodiment of the present invention.

A detailed description will now be made as to a preferred embodiment of the present invention with reference to the accompanying drawings. FIG. 6 illustrates an RLP sequence number generator according to an embodiment of the present invention. An RLP controller 61 receives a sequence number from a sequence number generator 62 and uses the received sequence number as a sequence number for an RLP frame being crated presently. A memory 63 is a device for storing the sequence number tree, wherein positions of the respective nodes are pointed by a node pointer. The memory 63 stores information about nodes of the sequence number tree and about parent and child nodes of the respective nodes. Here, the respective nodes store the determined sequence number and frame size. A node pointer 64 is a device for pointing at one of the nodes belonging to the stored sequence number tree. A first register 65 is a 16-bit register for storing a sequence number value which is referred to by the sequence numbers for the RLP frame being created presently. A second register 66 is a 16-bit register for storing the number of the sequence numbers required at the highest data rate.

The sequence number generator 62 may receive the following commands from the RLP controller 61:

1) Re-establish Command

The RLP controller 61 can send a re-establish command and a sequence number SEQ to the sequence number generator 62. Upon receipt of the re-establish command, the sequence number generator 62 operations the following operations:

First, the sequence number generator 62 calculates a quotient S and a remainder M by dividing the received sequence number value SEQ by the value stored in the second register 66.

Second, the sequence number generator 62 sets a value of the first register 65 to the calculated value S.

Figure 7:
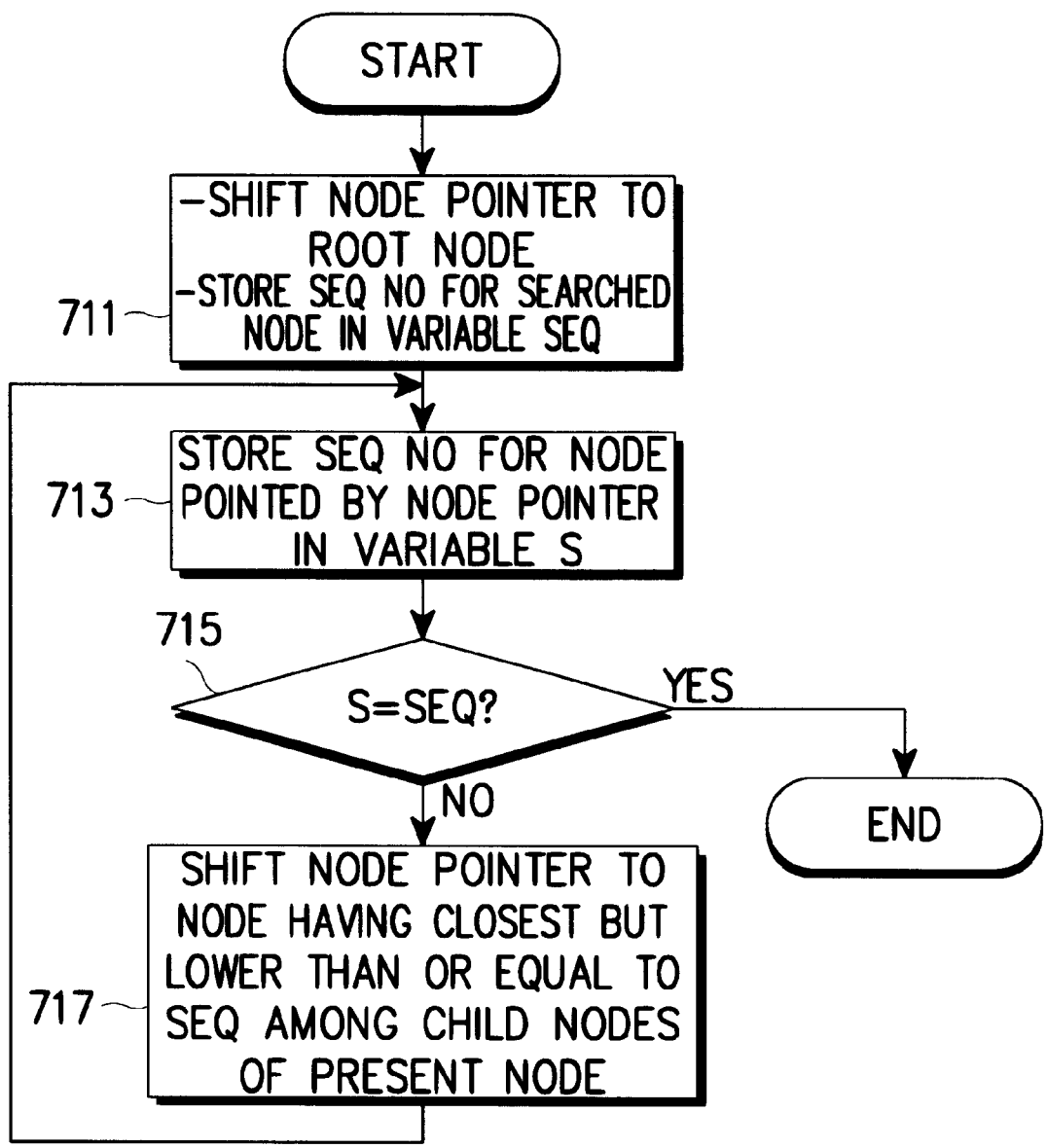
FIG. 7 is a flow chart illustrating a procedure for searching for a node in a sequence number tree according to an embodiment of the present invention.

Third, the sequence number generator 62 searches the sequence number tree stored in the memory 63 for a node having a sequence number corresponding to the remainder M. FIG. 7 illustrates the search procedure. Referring to FIG. 7, in step 711, the node pointer 64 is enabled to point at the root node of the sequence number tree stored in the memory 63; and a sequence number corresponding to a searched node is stored in the variable SEQ. Thereafter, in step 713, a sequence number for a node presently pointed by the node pointer is stored in the variable S. Subsequently, it is examined in step 715 whether the sequence number value S for the node presently pointed by the node pointer is equal to the sequence number value SEQ corresponding to the searched node. When the two values are equal to each other, the procedure terminates because the presently pointed node is the searched node.

Otherwise, when the two values are not equal to each other, the procedure goes to step 717 where the node pointer shifts to a node having the closest but lower or equal sequence number value as a sequence number among the child nodes of a node presently pointed by the node pointer. Thereafter, the procedure returns to step 713 to repeat the succeeding steps.

Fourth, upon completion of the above procedure, the sequence number generator 62 informs the RLP controller 61 that re-establishment has been successfully completed.

2) Sequence Number Request

Figure 8:
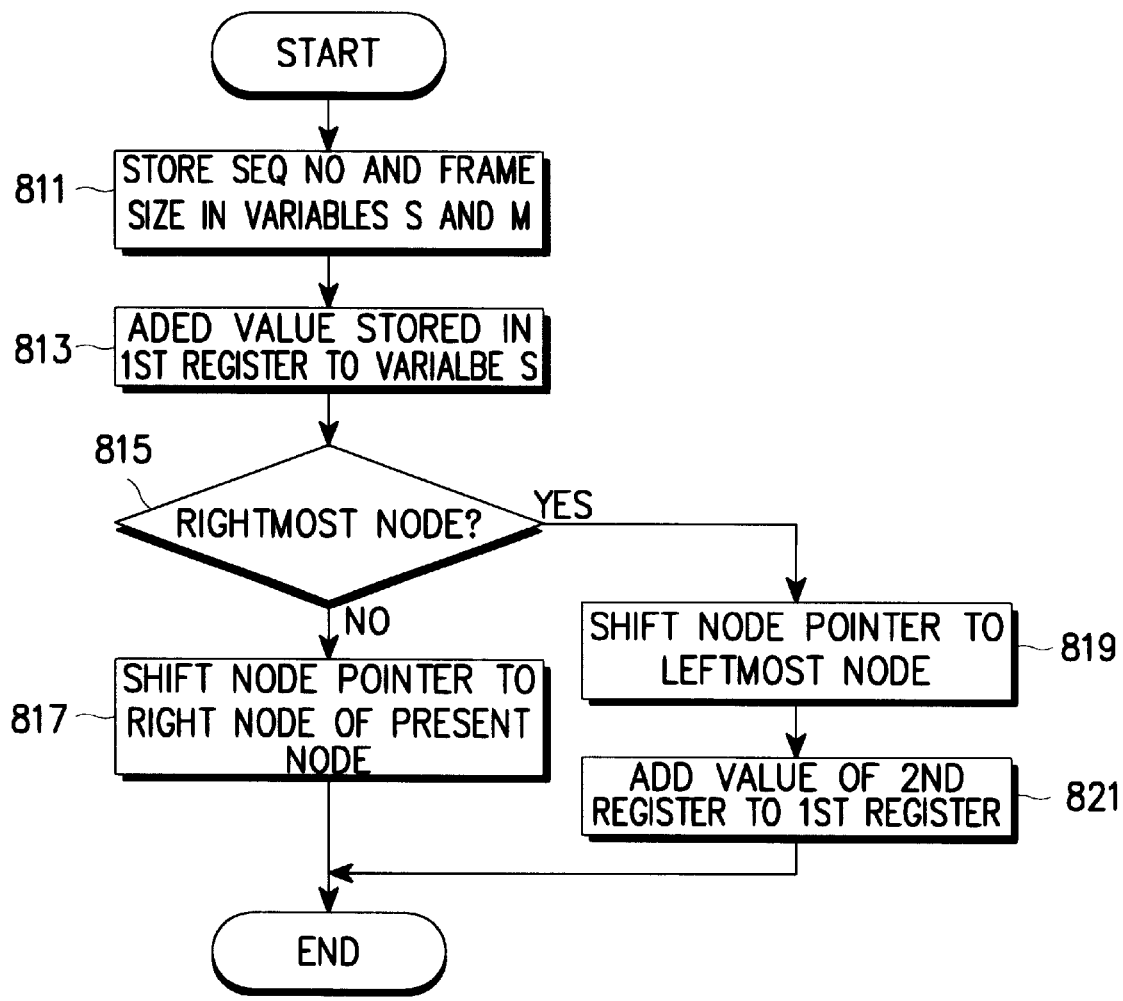
FIG. 8 is a flow chart illustrating a procedure for generating sequence numbers referring to a sequence number tree according to an embodiment of the present invention.

The RLP controller 61 can send a sequence number request to the sequence number generator 62. Upon receipt of the sequence number request, the sequence number generator 62 generates a sequence number in accordance with the procedure of FIG. 8 and then, sends the generated sequence number to the RLP controller 61. Referring to FIG. 8, in step 811, the sequence number generator 62 reads a sequence number and a frame size from a node presently pointed by the node pointer and stores them in the variables S and M, respectively. In step 813, the sequence number generator 62 adds a value stored in the first register to the variable S. Here, the S and M values become a sequence number to be provided to the RLP controller 61 and a possible frame size, respectively. After determination of the sequence number and frame size, the sequence number generator 62 shifts the node pointer to prepare for the next sequence number. Here, the sequence number generator 62 determines in step 815 whether a node pointed by the node pointer is the rightmost node. When the node pointer does not point at the rightmost node, the sequence number generator 62 proceeds to step 817 to shift the node pointer to a node located at an immediate right side of the present node and then, ends the procedure.

However, when the node pointer points at the rightmost node, the sequence number generator 62 shifts in step 819 the node pointer at the leftmost node in the present tree depth since the node pointer cannot proceeds to the right side. After shifting the node pointer, the sequence number generator 62 adds a value of the second register 66 to the first register 65 in step 821, and terminates the procedure. Upon completion of the above procedure, the sequence number generator 62 provides the RLP controller 61 with the variable S for the sequence number and the variable M for the possible frame size.

3) Notification of Data Rate Change

Figure 9:
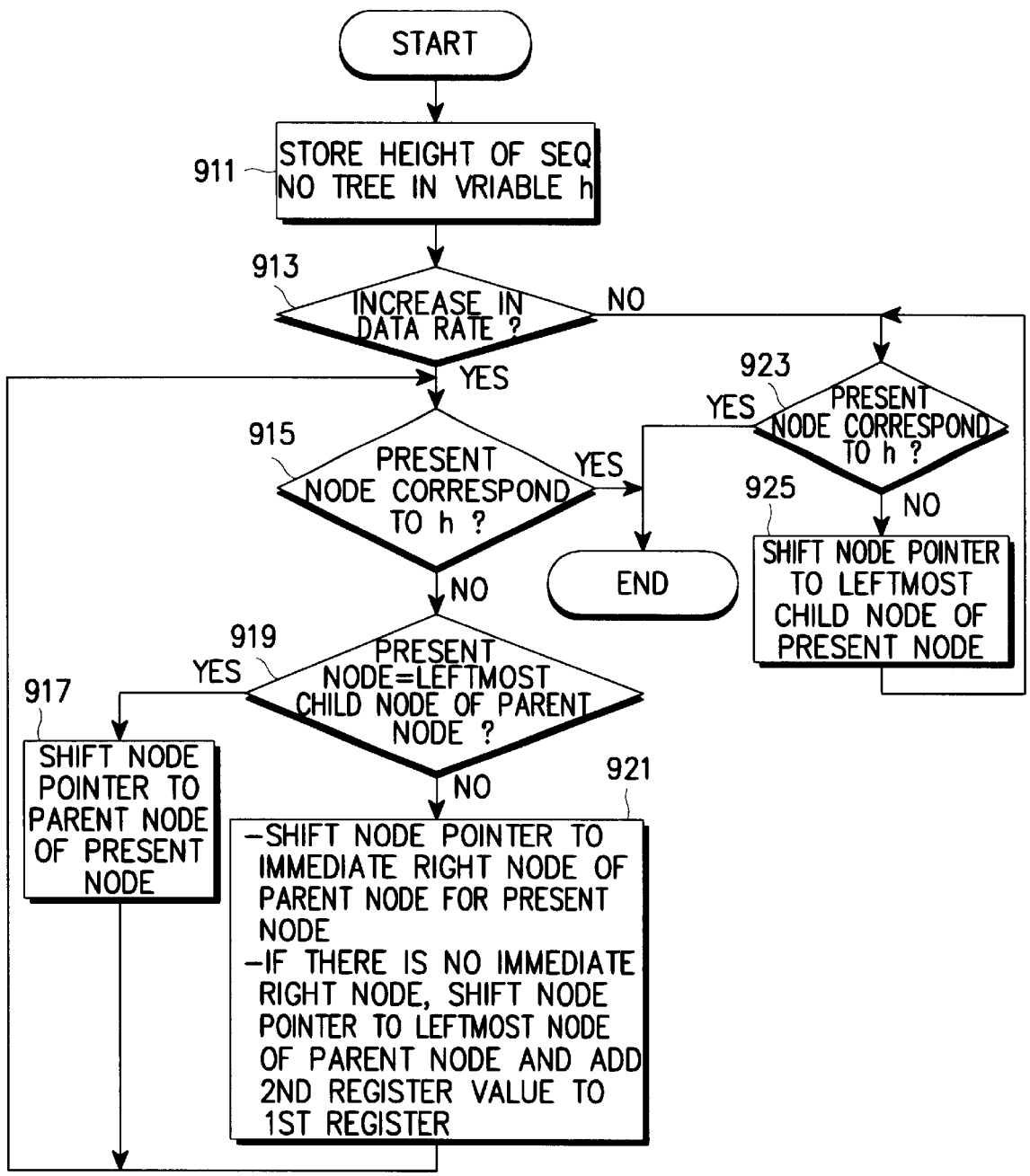
FIG. 9 is a flow chart illustrating a procedure for changing a node pointer according to a change in data rate in a sequence number tree according to an embodiment of the present invention.

The RLP controller 61 can notify a change in data rate to the sequence number generator 62. Upon receipt of the data rate change notification, the sequence number generator 62 controls the node pointer in accordance with the procedure of FIG. 9. Referring to FIG. 9, in step 911, the sequence number generator 62 stores a height of the sequence number tree according to the changed data rate in the variable h. Thereafter, the sequence number generator 62 determines in step 913 whether the data rate has increased. When the data rate has increased, the sequence number generator 62 proceeds to step 915 to examine whether a node presently pointed by the node pointer corresponds to the height stored in the variable h. When the present node corresponds to the height stored in the variable h, the routine terminates; otherwise, the routine proceeds to step 919 to examine whether a node presently pointed by the node pointer is the leftmost node for a parent node. When it is the leftmost node, the sequence number generator 62 shifts the node pointer to a parent node of the node presently pointed by the node pointer in step 917 and then, returns to step 915.

However, when it is not the leftmost node, the procedure goes to step 921 where the sequence number generator 62 shifts the node pointer to a node located at an immediate right side of the parent node of the node presently pointed by the node pointer and then, returns to step 915. Here, if there is no right node, the sequence number generator 62 shifts the node pointer to the rightmost node of the parent nodes, adds a value of the second register 66 to the first register 65 and then, returns to step 915.

In the meantime, if it is determined in step 913 that the data rate has decreased, the sequence number generator 62 examines in step 923 whether a node presently pointed by the node pointer corresponds to a height stored in the variable h. When the present node corresponds to the variable h, the sequence number generator 62 ends the procedure; otherwise, the sequence number generator 62 shifts the node pointer to the leftmost child node of the node presently pointed by the node pointer in step 925 and then, returns to step 923. After completion of the above procedure, the sequence number generator 62 notifies the RLP controller 61 that the node pointer has been successfully controlled.

Figure 10:
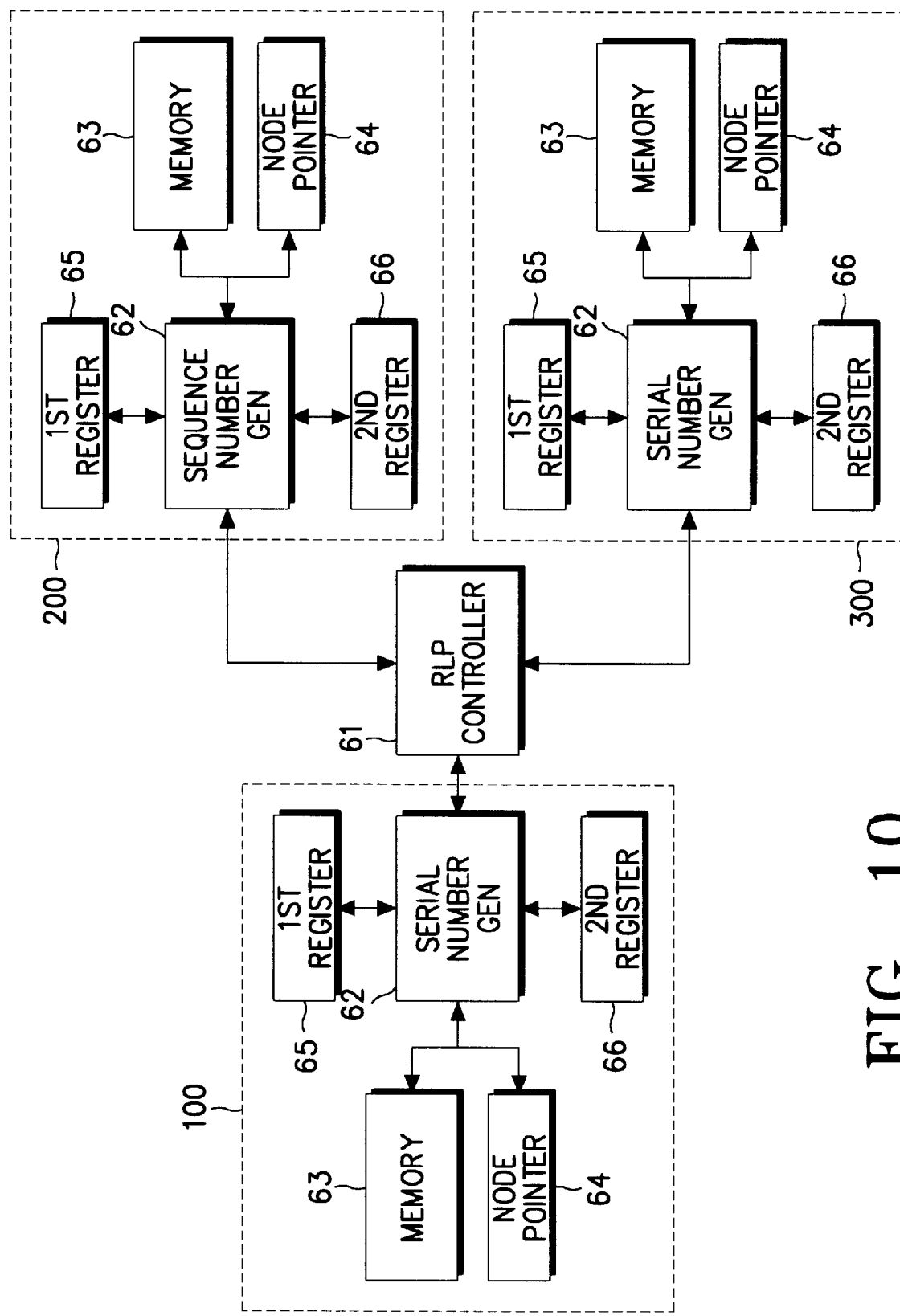
FIG. 10 is a block diagram illustrating an RLP controller and RLP sequence number generators according to an embodiment of the present invention.

The RLP controller 61 determines a sequence number of a frame to be transmitted using the sequence number generator 62. FIG. 10 illustrates the connection between the RLP controller 61 and several RLP sequence number generators 100–300. The RLP controller 61 uses the RLP sequence number generator 100 for generating a sequence number for a frame to be newly transmitted; the RLP controller uses the RLP sequence number generator 200 for calculating a sequence number for a frame to be received next; and the RLP controller 61 uses the RLP sequence number generator 300 for a frame to be retransmitted.

The RLP controller 61 is provided with a sequence number from the RLP sequence number generator 100 during generation of a frame to be newly transmitted, in the following process: First, the RLP controller 61 sends a re-establish command together with a sequence number "0" to the RLP sequence number generator 100 at every initialization. Second, the RLP controller 61 notifies a change in data rate together with the changed data rate to the RLP sequence number generator 100 whenever the data rate is changed. Third, the RLP controller 61 sends a sequence number request to the RLP sequence number generator 100 during generation of a frame to be newly transmitted. When a possible data size provided from the RLP sequence number generator 100 is not the maximum size of data to be presently transmitted, the RLP controller 61 sends a sequence number request to the RLP sequence number generator 200. The RLP controller 61 repeats the above process until the possible data size provided from the RLP sequence number generator 100 becomes the maximum size of data to be presently transmitted. When the possible data size provided from the RLP sequence number generator 100 becomes the maximum size of data to be presently transmitted, the RLP controller 61 uses the provided sequence number as a sequence number for a new frame.

The reason for calculating the sequence number until the data size becomes the maximum is to prevent a decrease in transmission efficiency which may be caused when data is transmitted in a frame having a size smaller than that guaranteed at the present data rate. Of course, when the above method is used, an RLP controller at the receiving party should predict a sequence number of a new frame to be received in the same manner, in order to know the sequence numbers which are not used by an RLP controller at the transmission party. Therefore, although there are missing sequence numbers, the receiving party will not send a re-transmit request to the transmission party.

The RLP controller 61 is provided with a sequence number from the RLP sequence number generator 200 during generation of a frame to be received next, in the following process: First, the RLP controller 61 sends a re-establish command together with a sequence number "0" to the RLP sequence number generator 200 during every initialization. Second, the RLP controller 61 notifies a change in data rate together with the changed data rate to the RLP sequence number generator 200 whenever the data rate is changed. Third, the RLP controller 61 sends a sequence number request to the RLP sequence number generator 200 during prediction of a sequence number for the frame to be received next. When a possible data size provided from the RLP sequence number generator 200 is not the maximum size of data to be presently transmitted, the RLP controller 61 sends a sequence number request to the RLP sequence number generator 200. The RLP controller 61 repeats the above process until the possible data size provided from the RLP sequence number generator 200 becomes the maximum size of data to be presently transmitted. When the possible data size provided from the RLP sequence number generator 200 becomes the maximum size of data to be presently transmitted, the RLP controller 61 uses the provided sequence number as a sequence number for the frame to be received next.

As stated above, since the RLP controllers at both the receiving party and the transmission party use the same methods for predicting the sequence number to be used. When the predicted sequence number obtained in the above process does not coincide with a sequence number for the actually received new frame, the RLP controller in the receiving party sends a retransmit request for the missing sequence number to the RLP controller in the transmission party. Upon receipt of the retransmit request, the RLP controller in the transmission party retransmits a data portion having a sequence number corresponding to the retransmit request.

During retransmission of the data portion, the RLP controller in the transmission party is provided with a sequence number to be assigned to the frame to be retransmitted, from the RLP sequence number generator 300 for generating a sequence number for the retransmission frame, in the following process: First, the RLP controller 61 sends a re-establish command together with a sequence number for the requested data portion to the RLP sequence number generator 300 when the retransmission frame is first transmitted. Second, the RLP controller 61 notifies a change in data rate together with the changed data rate to the RLP sequence number generator 300 whenever the data rate is changed. Third, the RLP controller 61 requests the RLP sequence number generator 300 to provide a sequence number to be assigned to the retransmission frame including the data portion to be retransmitted this time. The RLP controller 61 assembles the retransmission frame with the data portion to be retransmitted, from which a possible data size provided from the RLP sequence number generator 300 is removed, using the provided sequence number and then, transmits the assembled retransmission frame. While assembling a frame to be retransmitted next, the RLP controller 61 transmits a next data portion rather than a data portion already transmitted. Fourth, after transmission of all the requested data portions in the above process, the RLP controller 61 finishes retransmission.

Figure 11:
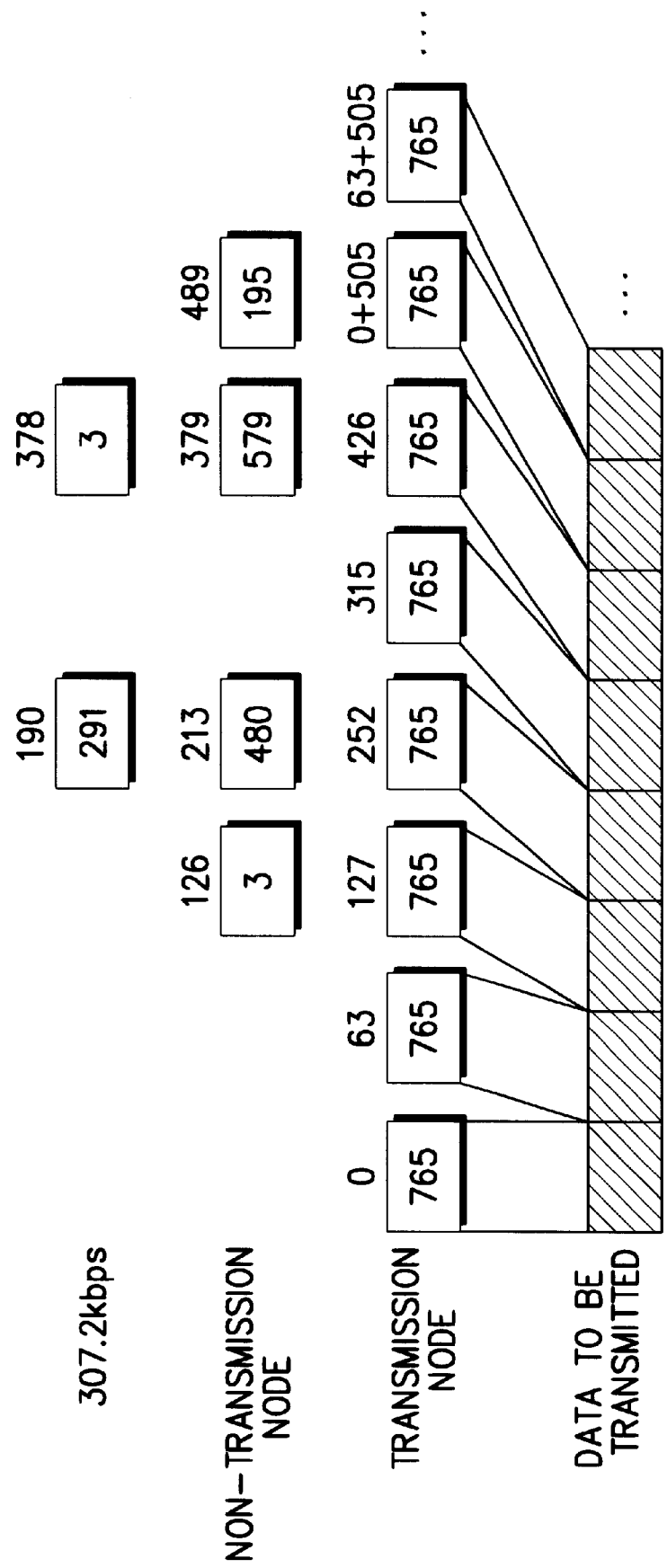
FIG. 11 is a diagram illustrating how to process sequence numbers for retransmission according to an embodiment of the present invention.

FIG. 11 illustrates how to process the sequence numbers for retransmission. FIG. 11 shows a case where data is transmitted at a data rate of 307.2 Kbps based on the sequence number tree determined in accordance with the procedure of FIG. 4. First, a transmission party sends frames using sequence numbers "0" and "63". Although a sequence number "126" exists on the sequence number tree, it is not used to maintain transmission efficiency since its permissible size is smaller than a permissible size of 765 bytes at the data rate of 307.2 Kbps. A frame having a sequence number "127" can transmit 765 bytes, another data frame is transmitted using the sequence number "127". In the same manner, sequence numbers "190", "213", "378", "379" and "489" are not used, and data frames are transmitted using sequence numbers "252", "315", "426", "0+505" and "63+505".

If the data rate increases during the above process, the node pointer shifts to a parent node of a node presently pointed by the node pointer. Alternatively, if the dat rate decreases during the above process, the node pointer is controlled to shift to the leftmost child node out of the child modes of the present node pointed by the node pointer. In this manner, it is possible to continue transmission regardless of a change in data rate.

During the above process, if a node for retransmission is placed under a node for transmission at the present data rate, it is sufficiently possible to perform retransmission at the present data rate. However, if a node for retransmission is placed over a node for transmission at the present data rate, a frame to be transmitted should be segmented into several frames before transmission.

Figure 12:
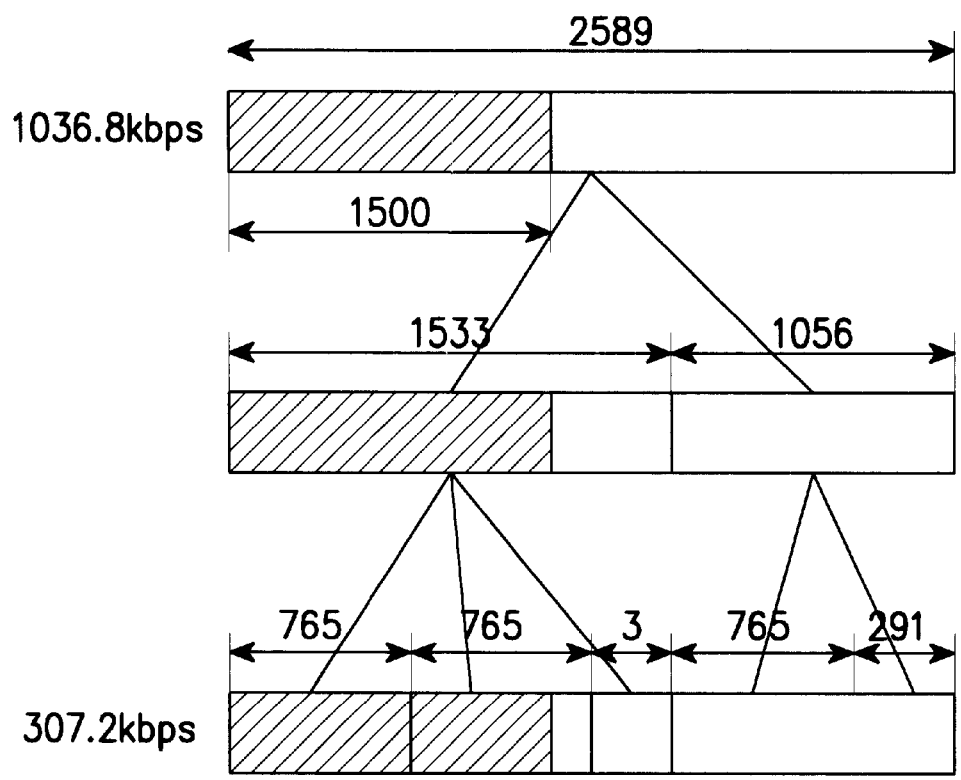
FIG. 12 is a diagram illustrating a case where a frame is segmented into several sub-frames due to a decrease in data rate during retransmission according to an embodiment of the present invention.

FIG. 12 illustrates a case where a frame is segmented into several sub-frames during retransmission. Specifically, FIG. 2 shows a case where 1500-byte data being transmitted a data rate of 1036.8 Kbps is segmented into five frames at a data rate of 307.2 Kbps. Here, the 1500-byte data is much shorter than the maximum size of 2589 bytes which is guaranteed at the data rate of 1036.8 Kbps, so that if it is segmented into two frames at the data rate of 307.2 Kbps, the two frames both can be transmitted. Therefore, it is also possible to create a new field, END field, at a header of the RLP frame and display when transmitting a parent node or forefather node, indicating that the child node is the last node and there is no more data to be transmitted, thereby providing an effective retransmission method.

As described above, a novel IMT-2000 system supporting various data rates employs an expanded sequence number generation method when using a radio link protocol. Hence, it is possible not only to easily cope with a change in data rate but also to guarantee effective retransmission by transmitting an END field.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for generating sequence numbers for a radio link protocol (RLP) frame in a mobile communication system, comprising the steps of:

generating a sequence number tree having a plurality of nodes each associated with frame information and an available data rate;

upon receipt of a sequence number request from an RLP controller, reading, at an RLP sequence number generator, frame information for a designated node from the sequence number tree and providing the read frame information to the RLP controller; and upon receipt of the frame information in response to the sequence number request, transmitting and receiving a frame at the RLP controller.

2. The method as claimed in claim 1, wherein the sequence number tree generating step comprises the steps of:

creating a number of child nodes equal to a quotient obtained by dividing a frame size of a parent node by a frame size of a child node;

creating an additional child node if a remainder exists after dividing the frame size of the parent node by the frame size of the child node;

storing a frame size in the child nodes created based on the value of the quotient;

storing the remainder in the additional child node created due to the remainder; and assigning sequence numbers to the created child nodes.

3. The method as claimed in claim 2, wherein a number of the assigned sequence numbers for the child nodes is equal to a total number of leaf nodes which can be created from a child node taking a sequence number assigned to the parent node as a starting sequence number.

4. The method as claimed in claim 3, wherein the step of assigning sequence numbers to the child nodes comprises the steps of:

upon receipt of a sequence number request from the RLP controller, reading a sequence number and a frame size of a node designated by a node value determined according to a present data rate and a frequency of sequence number requests;

providing the RLP controller with a sequence number obtained by adding a reference sequence number to the read sequence number and with the read frame size; and accumulating the number of the leaf nodes on the sequence number tree to the reference sequence number whenever designation for nodes corresponding to the present data rate is circulated to update the reference sequence number.

5. The method as claimed in claim 4, wherein the step of transmitting a frame at the RLP controller comprises the steps of:
   receiving a sequence number and a frame size from the RLP sequence number generator in response to the sequence number request;
   comparing the received frame size with a frame size corresponding to the present data rate;
   forming, when the frame size provided from the RLP sequence number generator is equal to the frame size corresponding to the present data rate, a transmission frame having said frame size, assigning the sequence number provided from the RLP sequence number generator to the transmission frame and transmitting the sequence number-assigned transmission frame;
   repeatedly sending the sequence number request until the equal frame size provided from the RLP sequence number generator is not equal to the frame size corresponding to the present data rate.

6. The method as claimed in claim 5, further comprising the step of retransmitting a data portion of a frame having a sequence number for which the RLP controller has received a retransmission request from an RLP controller of a receiving party intended to receive the frame.

7. The method as claimed in claim 4, wherein the step of receiving a frame comprises the steps of:
   receiving a sequence number and a frame size from the RLP sequence number generator in response to the sequence number request;
   comparing the received frame size with a frame size corresponding to the present data rate;
   monitoring whether a frame having a sequence number provided from the RLP sequence number generator is received when the received frame size is equal to the frame size corresponding to the present data rate; and
   repeatedly sending the sequence number request until the equal frame size provided from the RLP sequence number generator is not equal to the frame size corresponding to the present data rate.

8. The method as claimed in claim 7, further comprising the step of sending a retransmission request for non-received frames to an RLP controller of a transmitting party upon failure to receive a frame having a sequence number provided from the RLP sequence number controller in the monitoring step.

9. A method for generating sequence numbers for an RLP layer with a sequence number tree having a plurality of nodes each associated with frame information and data rates supportable in a mobile communication system, comprising the steps of:
   upon receipt of a re-establish request from an RLP controller, re-establishing, at an RLP sequence number generator, a node pointer for the sequence number tree to a node for a sequence number provided from the RLP controller; and
   upon receipt of data rate change notification from the RLP controller, shifting, at the RLP sequence number generator, the node pointer for the sequence number tree to a descendant node satisfying a data rate provided from the RLP controller.

10. A device for generating a sequence number for an RLP frame in a mobile communication system, comprising:
    an RLP sequence number generator storing a sequence number tree having a plurality of nodes each associated with frame information and at least one data rate supportable by the mobile communication system, and upon receipt of a sequence number request, reading frame information for a designated node from the sequence number tree to provide the read frame information; and
    an RLP controller for transmitting and receiving an RLP frame according to the frame information provided in response to the sequence number request.

11. The device as claimed in claim 10, wherein the RLP sequence number generator comprises:
    a memory for storing the sequence number tree;
    a node pointer for storing a node value determined according to a present data rate and a frequency of sequence number requests;
    a first register for storing a reference sequence number;
    a second register for storing a number of leaf nodes on the sequence number tree; and
    a sequence number generator for reading a sequence number and a frame size constituting frame information for a node corresponding to a node value in response to the sequence number request, and outputting the read frame size and a sequence number obtained by adding the reference sequence number to the read sequence number.

12. The device as claimed in claim 11, wherein the sequence number generator updates the reference sequence number by accumulating the number of the leaf nodes stored in the second register to the reference sequence number stored in the first register.

13. The device as claimed in claim 11, wherein when the frame size provided from the RLP sequence number generator is equal to the frame size corresponding to the present data rate, the RLP controller forms a transmission frame having said frame size, assigns the sequence number provided from the RLP sequence number generator to a transmission frame and transmits the sequence number-assigned transmission frame.

14. The device as claimed in claim 13, wherein the RLP controller repeatedly sends the sequence number request until the equal frame size provided from the RLP sequence number generator is not equal to the frame size corresponding to the present data rate.

15. The device as claimed in claim 11, wherein the RLP controller monitors whether a frame having a sequence number provided from the RLP sequence number generator is equal to a frame size corresponding to the present data rate.

16. The device as claimed in claim 15, wherein the RLP controller repeatedly sends the sequence number request until the frame size provided from the RLP sequence number generator is not equal to the frame size corresponding to the present data rate.

17. The device as claimed in claim 14, wherein at every change in data rate, the RLP controller provides the RLP sequence number generator with the changed data rate and a value indicating an amount of change in data rate.

18. A device for generating a sequence number for an RLP frame, comprising:
    a first RLP sequence number generator including a sequence number tree having a plurality of nodes associated with frame information and data rates, and upon receipt of a first sequence number request, read ing frame information for a designated node from the sequence number tree to provide the read frame information for a frame to be transmitted;

a second RLP sequence number generator including a sequence number tree having a plurality of nodes associated with frame information and data rates, and upon receipt of a second sequence number request, reading frame information for a designated node from the sequence number tree to provide the read frame information for a frame to be received next in order;

a third RLP sequence number generator including a sequence number tree having a plurality of nodes associated with frame information and data rates, and upon receipt of a third sequence number request, reading frame information for a designated node from the sequence number tree to provide the read frame information for a frame to be retransmitted; and an RLP controller for transmitting, receiving and retransmitting an RLP frame according to frame information received in response to the first, second and third sequence number requests.

19. The device as claimed in claim 18, wherein the first, second and third RLP sequence number generators each comprise:

a memory for storing their associated sequence number tree;

a node pointer for storing a node value determined according to a present data rate and a frequency of sequence number requests;

a first register for storing a reference sequence number;

a second register for storing the number of leaf nodes of their associated sequence number tree; and a sequence number generator for reading a sequence number and a frame size constituting frame information for a node corresponding to a node value in response to the sequence number request, and outputting the read frame size and a sequence number obtained by adding the reference sequence number to the read sequence number.

* * * * *